Sept. 27, 1932.  J. J. LAWLER  1,879,344

AUTOMATIC MIXING VALVE

Filed Oct. 29, 1931

Inventor
James J. Lawler.
by
[signature]
Attorneys

Patented Sept. 27, 1932

1,879,344

UNITED STATES PATENT OFFICE

JAMES J. LAWLER, OF MOUNT VERNON, NEW YORK

AUTOMATIC MIXING VALVE

Application filed October 29, 1931. Serial No. 571,888.

This invention relates to certain new and useful improvements in automatic mixing valves.

The primary object of the invention is to provide an automatic mixing valve wherein a valve casing is provided with separate inlets for hot and cold water and a mixing chamber for the water with a thermostatically operated valve controlling the entrance of hot water to the mixing chamber with the thermostatic element located in the mixing chamber so that water of the desired temperature may be delivered from the mixing valve.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1:
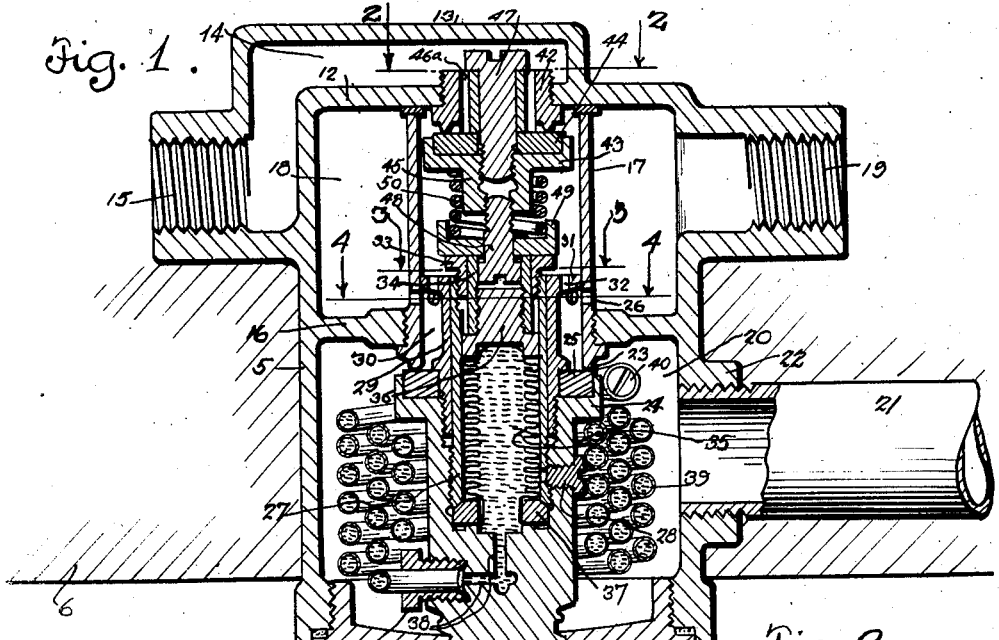
Figure 1 is a vertical longitudinal sectional view of an automatic mixing valve constructed in accordance with the present invention, showing hot and cold water inlets for the valve casing, the hot and cold water mixing chamber and the thermostatically operated valve for the hot water inlet.
Figure 2:
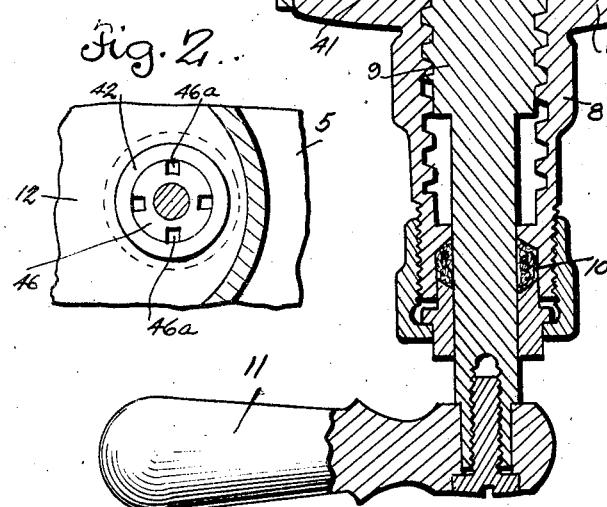
Figure 2 is a detail sectional view taken on line 2—2 of Figure 1, showing side passages through the valve opening for the hot water.
Figure 3:
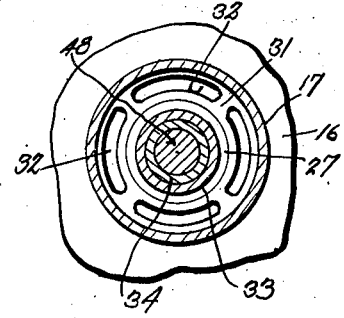
Figure 3 is a detail sectional view taken on line 3—3 of Figure 1, showing slotted openings in the main valve permitting flow of hot water into the mixing chamber.
Figure 4:
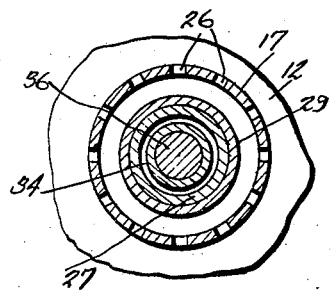
Figure 4 is a detail sectional view taken on line 4—4 of Figure 1, showing the apertured cylinder affording communication between the cold water inlet and the mixing chamber.

Referring more in detail to the accompanying drawing, the automatic mixing valve is intended for the supplying of water at predetermined temperatures and embodies a valve casing 5 adapted to be set into a wall structure of the like as indicated at 6, the mixing valve being primarily intended for bath purposes, although it is to be understood that the same may be utilized wherever it is desired to mix hot and cold water and deliver the same at predetermined temperature. The lower end of the valve casing 5 is closed by a removable cover wall 7 carrying a depending tubular extension 8 in which the main valve stem 9 is threaded, the valve stem projecting through the usual packing gaskets 10 or the like with an operating handle 11 upon its lower projecting end.

The upper end of the valve casing 5 is designed to provide an internal partition wall 12 spaced from the top wall 13 providing a hot water chamber 14 that has an inlet nipple 15 adapted for attachment to a source of hot water supply. A cross partition 16 is arranged substantially midway the upper and lower ends of the valve casing 5 and has a cylindrical member 17 threaded therein with the upper end thereof having a gasket tight connection with the partition wall 12, this cylindrical member 17 cooperating with the side walls of the valve casing 5 above the partition 16 to provide a cold water chamber 18 carrying a nipple connection 19 adapted for attachment to a source of cold water supply. The section of the valve casing 5 between the cover wall 7 and cross-partition 16 constitutes a mixing chamber 20 for hot and cold water while a water delivery pipe 21 is threaded in the boss 22 of the valve casing.

The lower end of the tubular member 17 below the cross-partition 16 constitutes a valve seat 23 to be engaged by a valve carried by the valve stem 9 and said valve stem 9 carries a floating valve cooperating with the valve seat carried by the upper partition wall 12 and a thermostatic device to effect automatic closing of the hot water valve. The inner upper end of the valve stem 9 is provided with a relatively large socket surrounded by an annular flange 24 constituting a valve and carrying a renewable valve face which is engageable with the valve seat 23 upon the lower end of the tubular member 17. When the valve 24 is in its closed position, the flow of hot or cold water to the mixing chamber is prevented, the flow of cold water being controlled by the valve 24 as the lower end of the tubular member 17 is provided with a circumferentially extending series of openings 26 adjacent the upper face of the cross-partition 16 that permits cold water in the chamber 18 to flow as far as the valve 24.

A relatively thin walled sleeve member 27 is externally threaded at its lower end for threaded engagement with the socket at the upper end of the valve stem 9 and is retained in position by the side screw 28 returning to a side wall of the stem socket and engaged with the sleeve member 27. An outer sleeve member 29 encloses the sleeve member 27 and has threaded engagement with the socket wall of the valve stem and is annularly flanged for engagement with the renewable valve face 25 to retain the latter in position, the outer sleeve member 29 being spaced from the cylindrical member 17 to provide an annular water flow space 30. The upper end of the member 29 carries an outwardly directed annular flange 31, having arcuate slots 32 therein with the flange disposed above perforations 26 and permitting the flow of hot water in the upper end of the cylindrical member 17 through the space 30 and by way of the valve 24 into the mixing chamber 20. A flanged collar 33 is threaded into the outer end of the inner sleeve member 27 and provides a bearing for the sliding sleeve 34, the sleeve 34 being carried by the thermostatic element within the socketed outer end of the valve stem 9.

An expansible tube 35 is arranged in the inner sleeve member 27 and the closed upper end thereof secured in any suitable manner to a plug 36 slidable in the sleeve 27 and having threaded engagement with the sleeve 34. The lower open end of the expansible tube 35 is anchored in the lower end of the stem socket by the ring member 37 and an angle passage 38 in the valve stem 9 forms communication between the expansible tube 35 and a thermostatic coil 39 arranged in the mixing chamber 20 and surrounding the valve stem 9, one end of the thermostatic coil 39 as shown at 40 constituting the filing end thereof and closed by a screw plug while the other end of the coil 39 is in communication with the angle portion 38 by means of a board packing gland 41 threaded into the valve stem 9 that causes a swaging of the anchored end of the coil 39 to provide a fluid-tight connection.

The valve for controlling the flow of hot water through the chamber 14 includes a valve seat 42 adjustably mounted in the partition wall 12 in line with the tubular member 17 that is engaged by a valve 43 having a renewable seat 44, the valve 43 carrying a depending internally threaded hollow boss 45. A guide for the valve 43 which is of the floating type comprises a plug 46 working through the bore of the valve seat 42 in wiping contact with the walls thereof, the plug being retained in position upon the renewable valve face 44 by a headed screw bolt 47 passed through the upper end of the plug 46 and threaded at its lower end into the tubular boss 45 depending from the valve 43. A headed screw plug 48 has the lower headed end thereof slidable in the upper end of the sleeve 34 with its threaded upper end engaged with the lower end of the threaded boss 45, and said screw bolt 48 freely supports a disk member 49 normally engaged with the collar 33 and sleeve 34 as shown in Figure 1, while a coil spring 50 is interposed between the disk 49 and valve 43, the spring 50 operating to maintain the valve 43 upon its seat 42 when the main valve 24 is in closed position upon the valve seat 23. The plug 46 is slidable through the bore of the valve seat 42 and has circumferentially spaced longitudinally extending edge grooves 46a to permit the flow of hot water through the bore of the valve seat and over the valve 43.

When the valve 24 is engaged with its seat 23, the flow of hot and cold water into the mixing chamber 20 is shut off and when the valve 24 is so disposed, the valve 43 is engaged with its seat 42. The valve 24 is unseated by rotating the valve stem 9, which operation permits cold water to the chamber 18 and the supply connected thereto as at 19 to flow through the openings 26, space 30 and into the mixing chamber 20 to be outletted to the pipe 21, tension on the spring 50 being relieved when the valve 24 is unseated so that hot water pressure in the chamber 14 and in the hot water supply line connected to the casing as at 15, will unseat the valve 24 and permit the water to flow through the passages 46a to the interior of the cylindrical member 17 and through the slotted openings 32 and space 31 to enter the mixing chamber 20. The temperature of the water flowing to the outlet pipe 21 is regulated by the thermostatic device including the coil 39 and the expansible tube 35, fluid in the expansible tube and coil causing an expansion of the tube 35 to cause the plug 36 therein to move through the inner sleeve member 27 to shift the disk member 49 in an upward direction against the tension of the spring 50 and to move the valve 43 toward its seat 42.

While there is herein shown and described the preferred embodiment of the invention, it is nevertheless to be understood that minor changes may be made therein without departing from the spirit and scope of the invention as claimed.

I claim:—

1. In an automatic mixing valve, a valve casing having hot and cold water inlets and a partition therein providing a mixing chamber, a valve seat on the partition, a manually operable valve engageable with the seat, a valve controlling the flow of hot water to the mixing chamber carried by the manually operable valve, a thermostatic element in the mixing chamber in communication with the hot water valve for regulating the temperature of water discharged from the mixing chamber, and a cylindrical member in the casing above the partition and surrounding the hot water valve to provide a cold water chamber.

2. In an automatic mixing valve, a valve casing having hot and cold water inlets and a partition therein providing a mixing chamber, a valve seat on the partition, a manually operable valve engageable with the seat, a valve controlling the flow of hot water to the mixing chamber carried by the manually operable valve, a thermostatic element in the mixing chamber in communication with the hot water valve and carried by the manually operable valve for regulating the temperature of water discharged from the mixing chamber, and a cylindrical member in the casing having threaded engagement with the partition and extending above the partition to surround the hot water valve to provide a cold water chamber.

3. In an automatic mixing valve, a valve casing having hot and cold water inlets and a partition therein providing a mixing chamber, a valve seat on the partition, a manually operable valve engageable with the seat, a valve controlling the flow of hot water to the mixing chamber carried by the manually operable valve, a thermostatic element in the mixing chamber in communication with the hot water valve for regulating the temperature of water discharged from the mixing chamber, a valve stem on the manually operable valve having a socket in its inner end, an expansible tube in the socket forming a part of the thermostatic element engaged with the hot water valve, and a cylindrical member in the casing having threaded engagement with the partition and extending above the partition to surround the hot water valve and engage the upper wall of the casing to provide a cold water chamber.

In testimony whereof I affix my signature.

JAMES J. LAWLER.